(12) United States Patent
Badazhkov

(10) Patent No.: US 12,359,559 B2
(45) Date of Patent: Jul. 15, 2025

(54) METHOD OF OIL AND GAS PRODUCTION USING IDENTIFICATION OF FRACTURE DEVELOPMENT ZONES IN MULTISTAGE HYDRAULIC FRACTURING

(71) Applicant: Smart Algorithms Limited Liability Company, Novosibirsk (RU)

(72) Inventor: Dmitrii Viktorovich Badazhkov, Novosibirsk (RU)

(73) Assignee: Smart Algorithms Limited Liability Company, Novosibirsk (RU)

( * ) Notice: Subject to any disclaimer, the term of this patent is extended or adjusted under 35 U.S.C. 154(b) by 0 days.

(21) Appl. No.: 18/574,407

(22) PCT Filed: Oct. 13, 2023

(86) PCT No.: PCT/RU2023/050239
§ 371 (c)(1),
(2) Date: Dec. 27, 2023

(87) PCT Pub. No.: WO2024/102027
PCT Pub. Date: May 16, 2024

(65) Prior Publication Data
US 2025/0101858 A1    Mar. 27, 2025

(30) Foreign Application Priority Data
Nov. 7, 2022 (RU) .......................... RU2022128663

(51) Int. Cl.
*E21B 47/06*    (2012.01)
*E21B 43/26*    (2006.01)
*G01V 1/50*    (2006.01)

(52) U.S. Cl.
CPC .............. *E21B 47/06* (2013.01); *E21B 43/26* (2013.01); *G01V 1/50* (2013.01);
(Continued)

(58) Field of Classification Search
CPC ........... E21B 47/06; E21B 43/26; G01V 1/50; G01V 2210/121; G01V 2210/324; G01V 2210/646
See application file for complete search history.

(56) References Cited

U.S. PATENT DOCUMENTS 5,963,508 A * 10/1999 Withers ................. G01V 1/288
166/250.1
7,100,688 B2 * 9/2006 Stephenson ............. E21B 43/26
166/308.1

(Continued)

*Primary Examiner* — Yong-Suk (Philip) Ro
(74) *Attorney, Agent, or Firm* — Rivka Friedman

(57) ABSTRACT

The invention relates to hydraulic fracturing (HF) of reservoir beds and can be used to identify the parameters to be applied for calculating and analyzing operations during the intensification of the fluid inflow from a reservoir during HF. The disclosed method allows identification of zones of HF fracture development, leakage in the shut-off plug and the production string, existence of overflows through liner hanger packers, confirmation of the opened HF port in the specified zone, determination of whether there is fluid injectivity downstream of the HF port, confirmation of HF injections in a given interval, determination of deflector operation during repeated HF activities on non-closable ports/perforation zones, and analysis of the perforation shots based on the pressure data records. The disclosed solution results in increasing the efficiency of the hydraulic fracturing process in complicated geological and physical environments.

2 Claims, 4 Drawing Sheets

Figure 1:
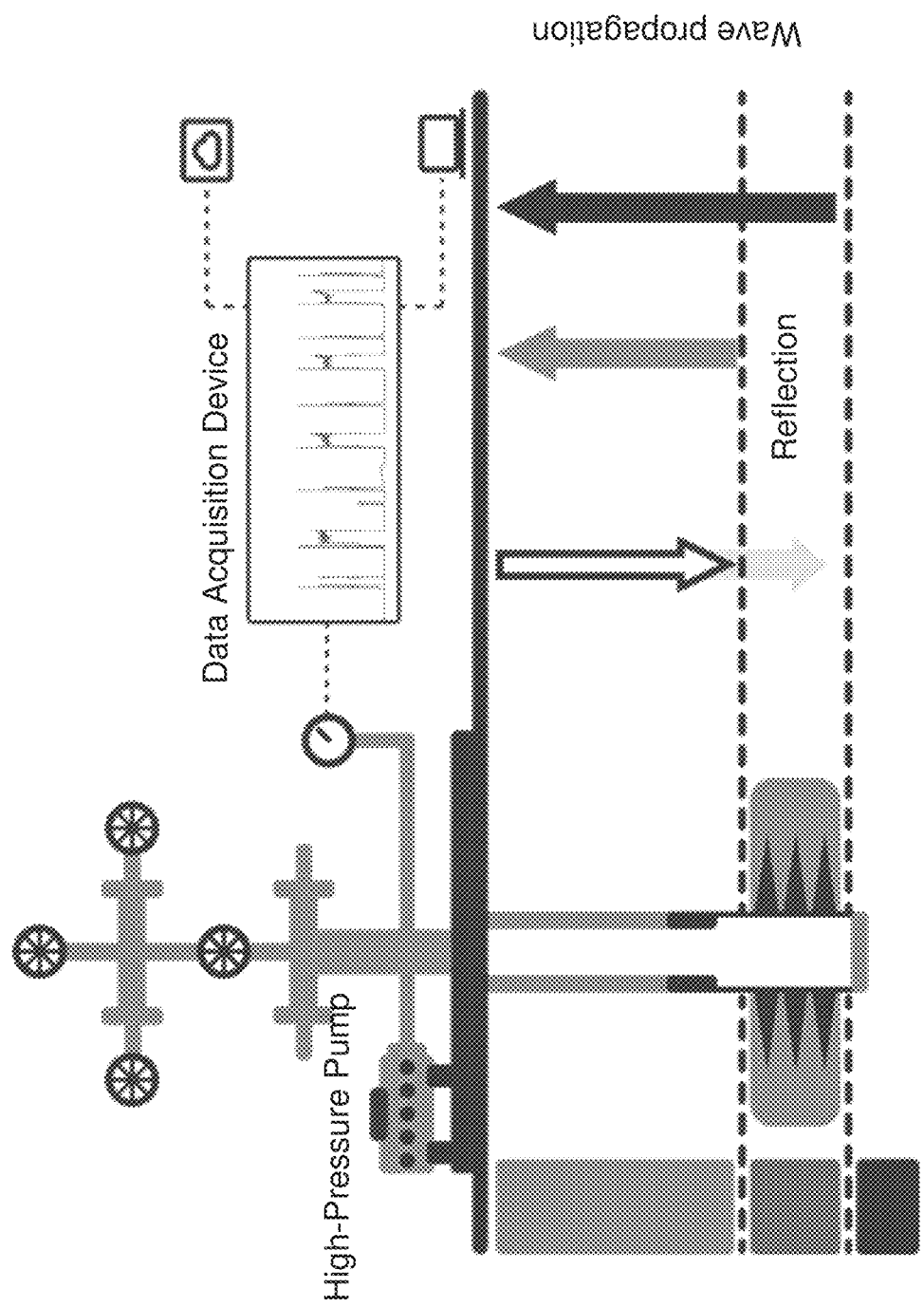

(52) U.S. Cl.
CPC .. *G01V 2210/121* (2013.01); *G01V 2210/324* (2013.01); *G01V 2210/646* (2013.01)

(56) References Cited

U.S. PATENT DOCUMENTS

| | | | |
|---|---|---|---|
| 2007/0215345 A1* | 9/2007 | Lafferty | E21B 47/017 166/308.1 |
| 2016/0146962 A1* | 5/2016 | Hayward | E21B 47/107 166/250.1 |
| 2017/0192117 A1* | 7/2017 | D'Angelo | G01V 1/303 |
| 2018/0094521 A1* | 4/2018 | Adamopoulos | E21B 47/18 |
| 2018/0203143 A1* | 7/2018 | Hall | E21B 43/263 |
| 2019/0055836 A1* | 2/2019 | Felkl | G01V 1/40 |
| 2020/0209418 A1* | 7/2020 | Brune | G01V 1/003 |
| 2022/0381933 A1* | 12/2022 | Abel | G01V 1/364 |

\* cited by examiner

METHOD OF OIL AND GAS PRODUCTION USING IDENTIFICATION OF FRACTURE DEVELOPMENT ZONES IN MULTISTAGE HYDRAULIC FRACTURING

The invention relates to hydraulic fracturing of reservoir beds and can be used to identify the parameters to be applied for calculating and analyzing operations during the intensification of the fluid inflow from a reservoir, in particular, when identifying the fracture closure pressure and the pressure in the fracture during hydraulic fracturing (HF).

Checking the integrity of the well assembly in a non-invasive way during hydraulic fracturing operations at the wellhead is a relevant issue, as it enables almost real-time monitoring of the well integrity during the operations without using any technologically complex equipment.

A method to identify the hydraulic fracturing parameters is known from the prior art (see patent RU2734202, IPC E21B 47/10, E21B 47/06, published on Oct. 13, 2020) and includes the following:
  injecting HF fluid into the reservoir to create a hydraulic fracture, recording pressure and feed;
  stopping fluid injection into the reservoir, recording the pressure drop;
  acquiring a dataset of pressure variation in the well before, during and after fluid injection;
  uploading to the software and visualizing the pressure change data in the format of time-dependent plots of pressure in the well;
  identifying the approximate value of the instantaneous shut-in pressure (ISIP);
  displaying pressure variation data and semi-logarithmic derivative of pressure on a log-log diagnostic plot;
  identifying the linear HF fluid flow mode in the fracture and the presence or absence of secondary wellbore storage effect mode;
  adjusting the log-log diagnostic plot to normalized form by finding such ISIP value where the curve $\Delta P$ and semi-logarithmic derivative at the section of linear fluid flow in the fracture are parallel to each other, and the slope of the tangent line to both curves is $P_d$, and the values of $\Delta P$ are numerically 2 times higher than the values of semi-logarithmic derivative;
  identifying the time of fracture closure using a normalized log-log diagnostic plot, wherein the initial divergence of the semi-log derivative with a straight line having a tangent angle of inclination to the OX axis equal to 1 is selected as the time of fracture closure if there is an identified secondary wellbore storage effect mode, and if there is no identified secondary wellbore storage effect mode, the initial divergence of the semi-log derivative with a straight line having a tangent angle of inclination to the OX axis equal to the Enlarged image (opens in a separate window) is selected as the time of fracture closure;
  identifying the fracture closure pressure using plots of the hydraulic fracturing fluid leakage function at the time of fracture closure obtained in the preceding paragraph;
  determining the net fracture pressure (Pnet).

The method described above was developed under the assumption of using a downhole pressure sensor, which makes the practical use of the technology more difficult.

A method for detecting in a well the objects that reflect a hydraulic signal is known from the prior art and accepted as the nearest analog (see patent RU2709853, IPC G01V 1/44, G01V 1/46, E21B 43/26, E21B 49/00, published on Dec. 23, 2019), wherein:

(a) there is a well filled with a fluid medium that allows hydraulic signal to pass through;
(b) there is at least one hydraulic signal source that can communicate with the well over fluid medium and is designed to generate a hydraulic signal;
(c) there is at least one pressure sensor that is designed to record a hydraulic signal and can communicate with the well over fluid medium and with, at least, one hydraulic signal source;
(d) hydraulic signal is recorded during well operations by using at least one pressure sensor;
(e) a pressure cepstrogram is generated and an intense signal is identified on the pressure cepstrogram;
(f) at least one object that reflects a hydraulic signal is detected in the well based on the peaks of the intense signal detected on the pressure cepstrogram.

The method described above uses cepstrogram as a key element to analyze the received signal (recorded echo), while all other elements, such as placing a pressure sensor in the well line, recording this pressure at some specified frequency (e.g., 1-200 reports per second, Hz) are common methods for monitoring the operations at the well site. The present invention uses echo extraction methods other than cepstral analysis and considers the impact of well design on the generation of the reflected signal to separate the desired and spurious signal during the analysis of pressure data.

The task of the claimed technical solution and the expected technical result consist in increasing the efficiency of the hydraulic fracturing process by monitoring the configuration of fractures obtained in the process of hydraulic fracturing, as well as in expanding the operational capabilities of the method in complicated geological and physical environments.

The technical result for one well is achieved in that the method for identifying the zones of HF fracture development in multistage hydraulic fracturing includes the following sequence of steps:
  installing a pressure sensor on the wellhead and turning on a pressure data acquisition device for recording;
  performing a HF stage that comprises at least two injections;
  at the end of injections, extracting from the pressure signal the sections of pressure oscillation that occur after the pumps are shut down;
  pre-processing the resulting signal with a band-pass filter to remove noise;
  using the resulting signal to identify the time of wave propagation in the well from the reflection point to the pressure sensor on the wellhead;
  identifying the wave propagation velocity based on the specified well geometry and injected fluid parameters (temperature, density);
  identifying the distance between the reflection points of the pressure oscillation wave in the well and the pressure sensor on the wellhead;
  repeating the required number of cycles at subsequent HF stages and, as they are performed, identifying the distance (event depth) between the reflection points of the pressure oscillation wave in the well and the pressure sensor on the wellhead based on the results obtained at the previous stages.

The technical result for a system of wells is achieved in that the method for identifying the zones of HF fracture development in multistage hydraulic fracturing includes the following sequence of steps:

a) performing multistage hydraulic fracturing (MHF), including the following:
   installing a pressure sensor on the wellhead and turning on a pressure data acquisition device for recording;
   performing a HF stage that comprises at least two injections;
   at the end of injections, extracting from the pressure signal the sections of pressure oscillation that occur after the pumps are shut down;
   pre-processing the resulting signal with a band-pass filter to remove noise;
   using the resulting signal to identify the time of wave propagation in the well from the reflection point to the pressure sensor on the wellhead;
   identifying the wave propagation velocity based on the specified well geometry and injected fluid parameters (temperature, density);
   identifying the distance between the reflection points of the pressure oscillation wave in the well and the pressure sensor on the wellhead;
   repeating the required number of cycles at subsequent HF stages and, as they are performed, identifying the distance (event depth) between the reflection points of the pressure oscillation wave in the well and the pressure sensor on the wellhead based on the results obtained at the previous stages;
   on the first well,
b) recalculating MHF design for remaining wells in the system based on the values of fracture development intervals obtained following the stage 'a)',
c) performing for the next well in the system the sequence of steps in accordance with stage 'a)',
d) recalculating MHF design for remaining wells in the system based on the values of fracture development intervals obtained following the stages 'a)' and 'c)',
e) iteratively repeating stages 'c)' and 'd)' for each subsequent well in the system.

Figure 2:
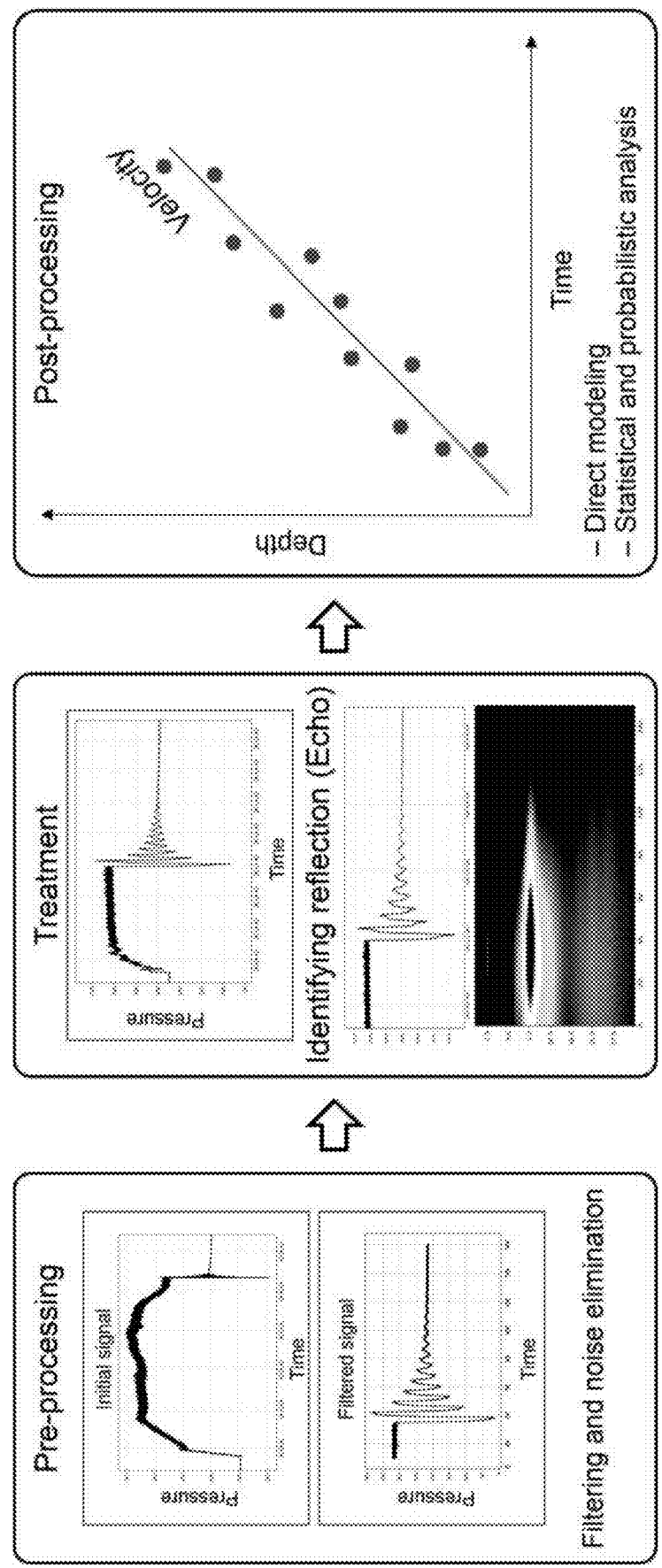
Figure 3:
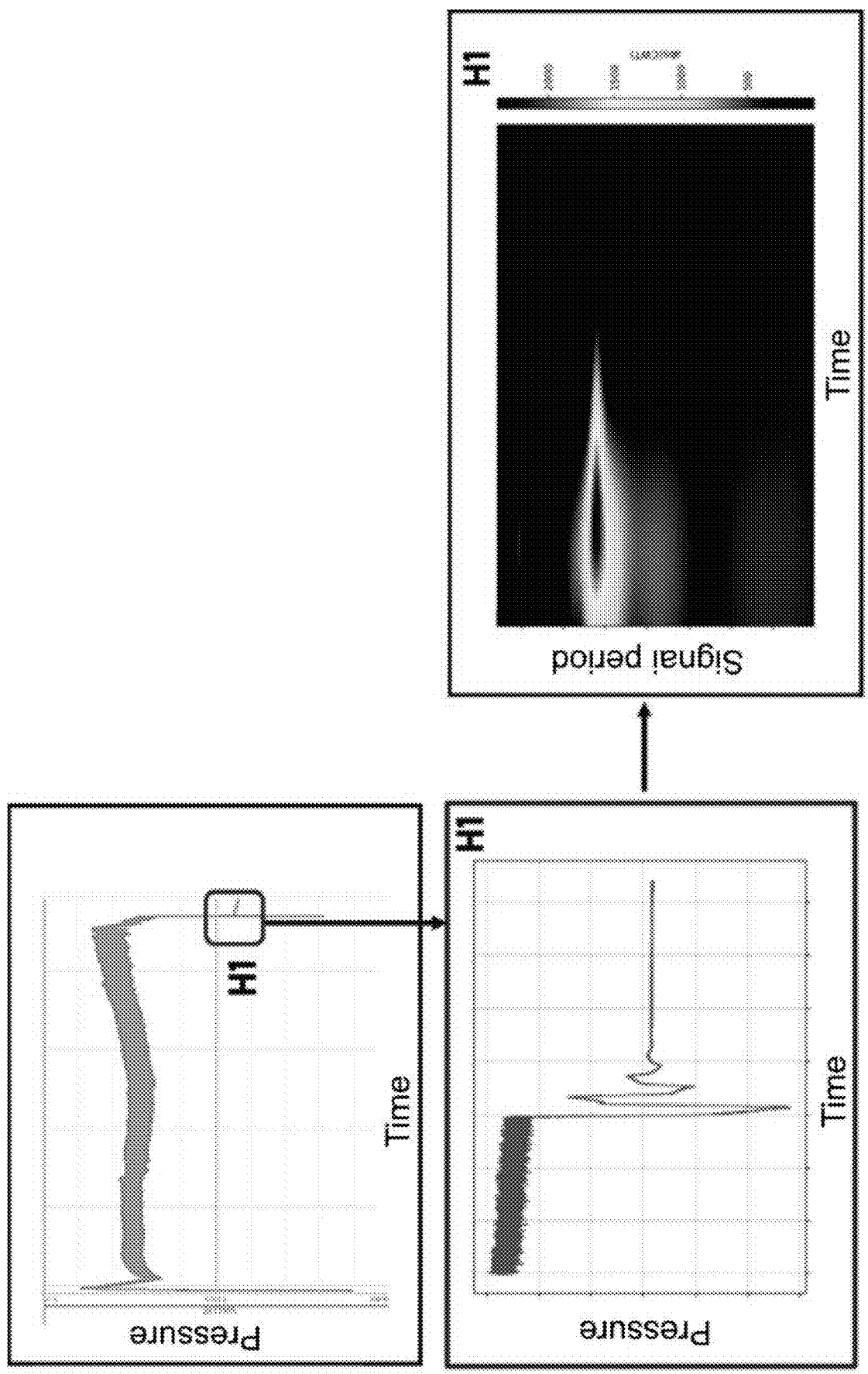
Figure 4:
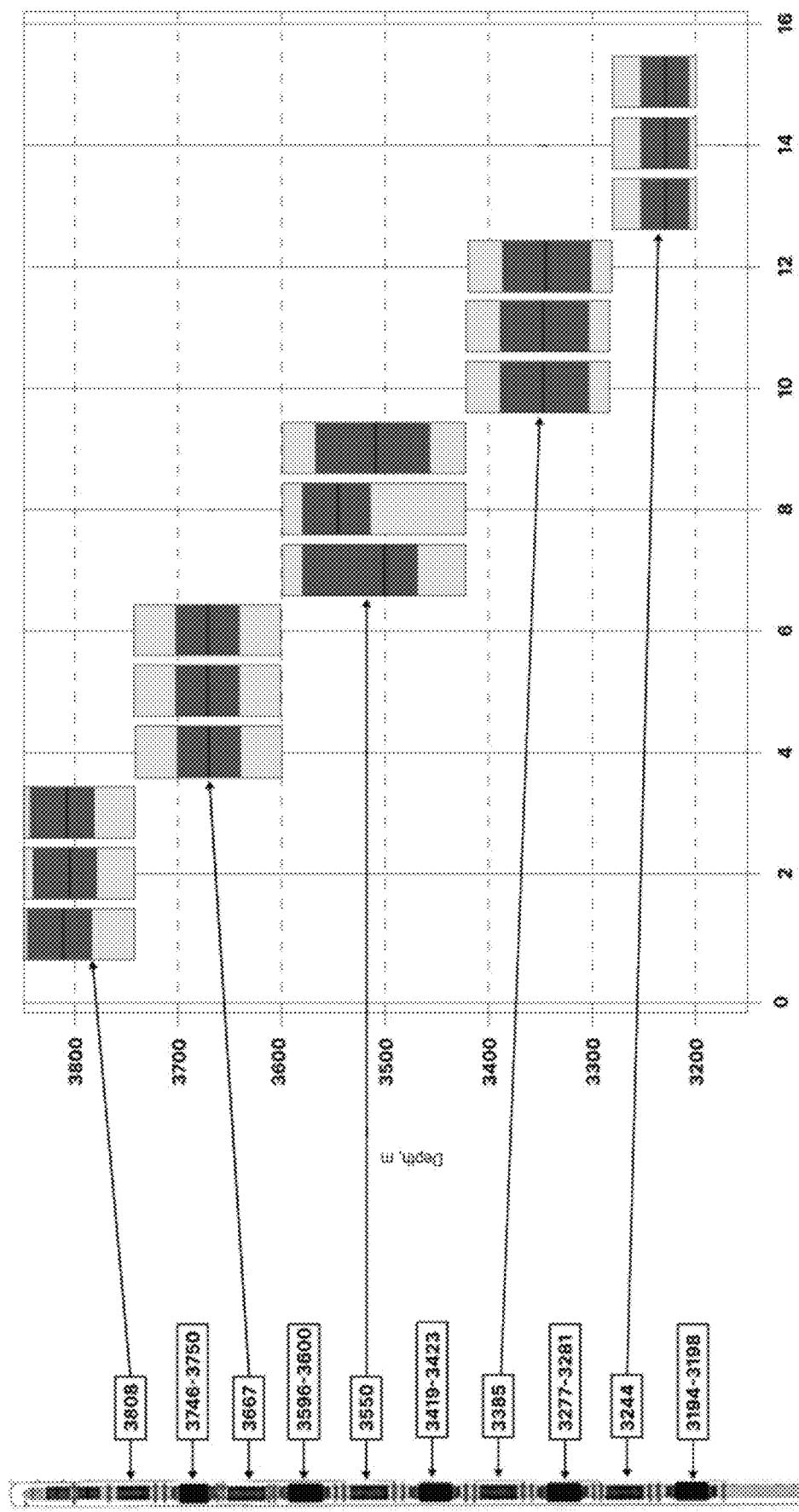

The claimed technical solution is explained by the drawings, where FIG. 1 presents a schematic diagram of reflected wave measurements during HF; FIG. 2 presents a flowchart of signal processing; FIG. 3 presents data on oscillations recorded on the wellhead after the shutdown of HF pumps during tests (sampling frequency 3 kHz) and their corresponding wavelet transform spectrum; FIG. 4 presents the results of processing based on the corresponding algorithms.

The claimed technical solution is implemented as follows.

A pressure sensor and data acquisition equipment are installed on the wellhead. At least two injections of injection fluid are made, after which the HF pumps are shut down. When the HF pumps are shut down, the pressure sensor detects a rarefaction wave (water hammer) in the wellhead as well as a signal generated by the reflected waves. The received signals are processed using algorithms (FIG. 2), namely, Windowed Fourier Transform, Wavelet Transform and Cepstral Transform, after which the obtained results are used as a basis to select the most optimal result in terms of calculated accuracy, which allows to position the entry point of the injected fluid.

During the testing process, Wavelet Transforms were used to determine reflection times (FIG. 3). The first three signals correspond to injections into the first interval of the well (depths of 3600-3425 m), the other three correspond to injections into the second interval (depths of 3425-3325 m). Each three signals correspond to the following HF operations: fluid replacement, mini HF, main HF operation. The results of processing allowed to obtain the points of fluid entry into the reservoir (FIG. 4) which, with a given uncertainty, fall within the given intervals of HF fracture creation. When inducing a different interval, or in cases of leakages in a different interval, packer failure, etc., these events will be time differentiated and identified and localized by the claimed method.

The basic algorithm for calculating the reflection depth of the events under study comprises the following steps:

(1) The recorded pressure signal with a frequency of up to 3000 reports per second (Hz) is filtered to remove noise from the desired signal. The filter is selected based on the conditions for minimal distortion of the desired signal shape along the time axis.

(2) The entire received signal is analyzed for reflections from events with known depth and reflections from the events under study.

(3) The sections with reflections are processed using algorithms, namely, Windowed Fourier Transform, Wavelet Transform and Cepstral Transform, after which the obtained results are used as a basis to select the most optimal result in terms of calculated accuracy, which allows to position the entry point of the injected fluid. This stage involves calculating the times for the reflection to pass from the event to the pressure sensor and the uncertainties of these times.

(4) The results obtained under the previous paragraph (times of signal reflection passage) are used to calculate the event depth, along with the propagation velocity (PV) of the reflection wave. PV can be identified using several methods, such as based on reflections from objects of known depth (for example, transition from a pipe with one diameter to a pipe with another diameter); based on statistical data known from neighboring wells of the same type and by taking into account the temperature regime and pressures used in the fluid; using initial physical approximations of velocity; using optimization, statistical and probabilistic algorithms; using direct physical and mathematical modeling of reflection wave propagation. All PV identification methods described in this paragraph can be used simultaneously for graphical and algorithmic comparison of the found solutions with known reference points in the well (e.g., positions of packers, transition of pipe diameters, positions of ports, depth of perforations and other elements of the well structure) and further for determination of the most probable reflection depths of the investigated events.

The method has the following embodiment in cases where MHF is performed on an integrated system of wells (well pad, field).

The entire set of MHF activities is carried out for the first well of the system.

Next, the basic MHF parameters are recalculated for all remaining wells of the system by considering the real values of fracture development intervals obtained at the first well following the set of MHF activities conducted on that well.

After that, a set of MHF activities is performed for the next well in the system and the parameters are recalculated for the remaining wells in the system until MHF activities are conducted on all wells in the system.

The claimed method allows to identify the following:
zones of HF fracture development,
leakage in the shut-off plug and the production string,
existence of overflows through liner hanger packers,
confirmation of the opened HF port in the specified zone,
determination of whether there is fluid injectivity downstream of the HF port (frac ball failure, HF coupling failure), confirmation of HF injections in a given interval (assemblies with closable ports) when conducting repeated MHF activities, determination of deflector operation during repeated HF activities on non-closable ports/perforation zones.

The claimed invention also allows to monitor the perforation shots (existence of a shot and its comparative amplitude) based on the pressure data records.

In addition, the invention may use a second pressure sensor positioned on the surface at a known distance from the main sensor (positioned on the wellhead) as an additional source of information to calibrate the velocity of the acoustic wave propagation in the well.

The invention claimed is:

1. A method for identifying fracture development zones in multistage hydraulic fracturing (HF), which includes the following sequence of steps:
   installing a pressure sensor on wellhead and turning on a pressure data acquisition device for recording;
   performing a HF stage that comprises at least two injections;
   at end of the injections, extracting from the recorded pressure signal sections of pressure oscillation that occur after pumps are shut down;
   pre-processing extracting from the recorded pressure signal with a band-pass filter to remove noise;
   using the extracting from the recorded pressure signal to identify time of wave propagation in well from reflection point to the pressure sensor on the wellhead;
   determining wave propagation velocity based on specified well geometry and injected fluid parameters that are temperature and density;
   identifying distance between the reflection points of the pressure oscillation wave in the well and the pressure sensor on the wellhead;
   repeating required number of cycles at subsequent HF stages and, determining the distance between the reflection points of the pressure oscillation wave in the well and the pressure sensor on the wellhead based on the results obtained at the subsequent HF stages during the repeating.

2. A method for identifying zones of hydraulic fracture (HF) development in multistage hydraulic fracturing includes the following sequence of steps:
   a) performing multistage hydraulic fracturing (MHF), including the following:
      installing a pressure sensor on a wellhead and turning on a pressure data acquisition device for recording;
      performing a HF stage that comprises at least two injections;
      at end of injections, extracting from a pressure signal sections of pressure oscillation that occur after pumps are shut down;
      pre-processing the extracting from the recorded pressure signal with a band-pass filter to remove noise;
      using the extracting from the recorded pressure signal to identify time of wave propagation in a well from reflection point to the pressure sensor on the wellhead;
      identifying wave propagation velocity based on specified well geometry and injected fluid parameters that are temperature and density;
      identifying a distance between the reflection points of the pressure oscillation wave in the well and the pressure sensor on the wellhead;
      repeating required number of cycles at subsequent HF stages and, determining the distance between the reflection points of the pressure oscillation wave in the well and the pressure sensor on the wellhead based on the results obtained at the subsequent HF stages during the repeating;
   on a first well,
   b) recalculating MHF design for remaining wells in a system based on values of fracture development intervals obtained following the stage 'a)',
   c) performing for a next well in the system the sequence of steps in accordance with stage 'a)',
   d) recalculating MHF design for remaining wells in the system based on the values of fracture development intervals obtained following the stages 'a)' and 'c)',
   e) iteratively repeating stages 'c)' and 'd)' for each subsequent well in the system.

* * * * *